United States Patent [19]

King et al.

[11] 4,315,819
[45] Feb. 16, 1982

[54] HOLLOW FIBER PERMEATOR APPARATUS

[75] Inventors: Duane E. King, Wake Forest; Billy J. Harris, Durham; Donald L. MacLean; Tommy E. Graham, both of Raleigh, all of N.C.

[73] Assignee: Monsanto Company, St. Louis, Mo.

[21] Appl. No.: 915,082

[22] Filed: Jun. 12, 1978

[51] Int. Cl.³ ............................................. B01D 31/00
[52] U.S. Cl. .................................. 210/321.3; 210/352
[58] Field of Search ................. 210/22, 321, 352, 356, 210/433.2; 165/159

[56] References Cited

U.S. PATENT DOCUMENTS

| | | | |
|---|---|---|---|
| 638,742 | 12/1899 | Murphy | 210/352 X |
| 2,654,482 | 10/1953 | Robinson et al. | 210/356 |
| 3,228,456 | 1/1966 | Brown et al. | 165/1 |
| 3,228,877 | 1/1966 | Mahon | 210/22 |
| 3,277,959 | 10/1966 | Withers | 165/159 |
| 3,526,001 | 8/1970 | Smith | 210/23 |
| 3,528,553 | 9/1970 | Caracciolo | 210/321 B |
| 3,616,928 | 11/1971 | Rosenblatt | 210/321 R |
| 3,660,281 | 5/1972 | Tober | 210/321 |
| 4,098,852 | 7/1978 | Christen | 165/60 X |

FOREIGN PATENT DOCUMENTS

| | | | |
|---|---|---|---|
| 1175124 | 12/1969 | United Kingdom | 210/321.3 |
| 1512458 | 6/1978 | United Kingdom | 210/321.3 |

Primary Examiner—Frank A. Spear, Jr.
Attorney, Agent, or Firm—Thomas E. Kelley; Howard C. Stanley; Norman L. Balmer

[57] ABSTRACT

The performance of axially-fed permeators containing a plurality of selectively permeable hollow fibers suitable for the selective permeation of at least one fluid in a fluid mixture containing at least one other component, wherein the hollow fibers are positioned in the permeator to form an elongated bundle of hollow fibers, is enhanced by the use of means to longitudinally compact the bundle.

22 Claims, 4 Drawing Figures

HOLLOW FIBER PERMEATOR APPARATUS

This invention pertains to apparatus for separating at least one fluid from a fluid mixture containing at least one other component by selective permeation of the at least one fluid through membranes.

The use of membranes for separating at least one fluid from a fluid mixture containing at least one other component has long been suggested. In these membrane separations, permeable fluids in the fluid mixture (feed mixture) pass, under the influence of a driving force such as concentration, partial pressure, total pressure, etc., (depending on the nature of the membrane and separation operation) from a feed side of the membrane to a permeate side of the membrane. The fluid may pass through the membrane by interaction with the material of the membrane or by flow in interstices or pores present in the membrane. Separations effected by membranes can include gas-solid liquid-solid, gas-gas, gas-liquid, and liquid-liquid separations.

The viability of the use of membranes for fluid separations as compared to other separation procedures such as absorption, adsorption, distillation, and liquifaction often depends on the cost, the degrees of selectivity of separation which is desired, the total pressure losses caused by the apparatus for conducting the separation procedure which can be tolerated, the useful life of such apparatus, and the size and ease of use of such apparatus. Film membranes may frequently not be as attractive as other separation apparatus due to the need for film membranes to be supported to withstand operating conditions and the overall complexity of apparatus containing film membranes. Membranes in the configuration of hollow fibers, or hollow filaments, may overcome some of the deficiencies of film membranes for many separation operations in that the hollow fibers are generally selfsupporting, even during operating conditions, and provide a greater amount of membrane surface area per unit volume of separation apparatus than that which is provided by film membranes. Thus, separation apparatus containing hollow fibers may be attractive from the standpoint of convenience in size and reduced complexity of design.

The two approaches which have primarily been proposed for apparatus for fluid separations employing hollow fiber membranes use a plurality of the hollow fibers generally parallelly arranged in an elongated bundle. One approach includes radially-fed permeators, e.g., separation apparatus wherein fluid at the exterior of the hollow fibers primarily passes through the permeator transverse to the predominant longitudinal orientation of the hollow fibers. The other approach includes axially-fed permeators, e.g., separation apparatus wherein fluid at the exterior of the hollow fibers primarily passes through the permeator in the same direction as the longitudinal orientation of the hollow fibers. Transverse flow of the fluid among the hollow fibers is at least partially due to dispersions caused by back pressures to fluid flow in the permeator. The efficiency of separation for a hollow fiber-containing permeator is dependent on the effective fluid distribution of the fluid at the exterior of the hollow fibers. Radially-fed permeators generally exhibit greater efficiencies of separation than do axially-fed permeators since in order to exit a radially-fed permeator, the fluid must transversely pass among the hollow fibers. On the other hand in axially-fed permeators, the fluid dispersion among the hollow fibers in the permeator is not so ensured. Despite the deficiencies which may exist in fluid dispersion around the exteriors of the hollow fibers in axially-fed permeators, such permeators offer significant advantage in terms of reduced construction difficulties and complexity over radially-fed permeators. Another significant advantage of axially-fed permeators is the benefit of cocurrent or countercurrent flow patterns with respect to the passage of fluid in the bores and at the exteriors of the hollow fibers.

While the efficiency of separation of axially-fed permeators might be enhanced by introducing the feed mixture containing the fluid to be separated into the bores of the hollow fibers, this procedure is often undesirable due to the significant pressure drops which might be encountered in the passage of the fluid mixture through the bores of the hollow fibers. Even with bore feed, some sacrifice in separation efficiency may still occur due to poor distribution of permeate, for instance, localized regions, or pockets, of permeate, on the shell side of the hollow fibers. Moreover, in some separation operations it is desirable to provide the feed mixture at the exterior of the hollow fibers since the feed mixture is at a higher total pressure than the total pressure on the permeate side of the membrane. Furthermore, if fouling of the membrane due to components in the feed mixture is a problem, any blockages caused by the fouling may result in less available membrane surface area being lost where the fouling is at the exterior of the hollow fibers rather than blocking or partially blocking any of the bores of the hollow fibers. Additionally, fabrication of the permeator may be facilitated since when the fluid mixture containing the fluid to be separated is contacted with the exterior of the hollow fibers, often only one end of each of the hollow fibers need be fabricated into a seal, or tube sheet, to enable fluid communication from the bores of the hollow fibers to the exterior of the permeator.

Accordingly, a means to enhance the efficiencies of separation of axially-fed permeators are sought. Rosenblatt in U.S. Pat. No. 3,616,928 discloses the use of highly crimped hollow fibers for use as separation membranes in an axially-fed permeator. The crimped fibers are adhesively bonded to one and another at a plurality of the abutting areas in order to maintain the desired spatial relationship between the hollow fibers. While the efficiency of separation may be high, it appears that due to the highly crimped nature of the hollow fibers less membrane surface area is provided per unit volume of apparatus than might be available in a radially-fed permeator having the same or greater efficiency of separation. Although the patentee provides no general indication of the proportion of the cross-sectional area of the permeator which is occupied by the hollow fibers (i.e., packing factor or packing density), this proportion appears to be relatively low, e.g., about 16 percent in Example 4, as compared to conventional permeators in which the feed is introduced into the bores of the hollow fibers (often about 45 to 60 or more percent is illustrated by Maxwell, et al, in U.S. Pat. No. 3,339,341 at column 5, lines 10 to 25). Moreover, the essential adhesive bonding of the hollow fibers to maintain their spatial relationships requires an additional processing step, and the adhesive reduces the available membrane surface area for effecting the fluid separation.

More recently Leonard in United States patent application Ser. No. 855,850, filed Nov. 30, 1977, now abandoned, discloses hollow fiber separation membranes having relatively low amplitude waves, or crimps, which can be assembled into bundles to provide desirably high packing factors in permeators while providing good fluid distribution. Although the hollow fiber separation membranes disclosed by Leonard can provide good efficiencies of separation while utilizing desirably high packing factors, difficulties which may adversely affect the efficiencies of separation may still occur. For instance, the hollow fibers may move, due, e.g., to the influence of fluid flows during the separation operation or the influence of gravity (e.g., settling) to form longitudinal channels having few, if any, hollow fibers. Thus, fluid will preferentially pass through the localized channels as opposed to dispersing among the hollow fibers. This channeling can therefore lead to losses in efficiencies of separation. Channeling, of course, can occur in permeators employing hollow fibers which do not have any crimp.

One method for reducing the effect of channeling is to increase the number of hollow fibers in the permeator such that deleterious channels can not readily form. However, as the number of hollow fibers increases the difficulty of insertion of the hollow fibers into the shell of the permeator also increases. Clearly, the insertion of the hollow fibers into the shell must be conducted without incurring undue damage to the hollow fibers. Moreover, even slight increases in packing factors caused by increasing the number of hollow fibers in the permeator have been found to provide much greater resistances to gases dispersing in a radial direction among the hollow fibers. Maxwell, et al, in U.S. Pat. No. 3,339,341, disclose a hollow fiber separation apparatus in which the fluid mixture containing the fluid to be separated is fed to the bores of the hollow fibers. The patentees indicate at column 5, lines 24 et seq., that packing densities over 40 percent are preferred and that at these packing densities do not prevent all movement of fluid into and out of the bundles between hollow fibers, but they do cause the fluids outside of the hollow fibers to flow along and in the direction of the hollow fibers. This objective may thus be contrary to obtaining good radial dispersion of fluids among hollow fibers in a permeator. Maxwell, et al, state that the use of a sweep gas at the exteriors of the hollow fibers is a preferred mode of operation (see column 7, line 5, et seq.). Apparently the radial distribution desired by Maxwell, et al, when employing a sweep fluid is fostered by utilizing a plurality of spaced-apart sub-groups, or sub-bundles, such that the sweep fluid could radially pass betwen the sub-bundles. Consequently, in view of the lesser diameter the sweep fluid can more readily disperse into the mid-portion of a sub-bundle than from the outside into the mid-portion of a bundle not containing these sub-bundles. Unfortunately, the preparation of sub-bundles requires additional processing steps in the fabrication of separation apparatus and also channels may exist between sub-bundles which reduce the efficiency of separation of the separation apparatus.

In view of the difficulties in fabricating axially-fed permeators which exhibit commercially desirable efficiencies of separation, it is not surprising that little research and development efforts have been expended on the fabrication of axially-fed permeators. Rather, significant efforts have been devoted to the fabrication of radially-fed permeators in which the achievement of high efficiencies of separation is more assured, especially if the feed mixture is to be fed to the exteriors of the hollow fibers. However, as pointed out above, axially-fed permeators can provide significant advantages over radially-fed permeators if non-complex means are provided to reliably increase the efficiencies of separation exhibited by axially-fed permeators.

By this invention axially-fed permeators containing hollow fiber separation membranes for separating by the selective permeation of at least one fluid from a fluid feed mixture containing at least one other component are provided which permeators exhibit highly desirable efficiencies of separation due to good dispersion of fluid at the exterior of the hollow fibers. Advantageously, the axially-fed permeators of this invention can be fabricated employing high hollow fiber packing factors which make efficient utilization of the volume of the permeator; however, the packing factor need not be so high as to present difficulties in the fabrication of the permeator of undue risk of damage to the hollow fibers. The benefits of the permeators of this invention can be achieved with relatively non-complex modifications of existing axially-fed permeator designs with little, if any, increase in fabrication efforts. Moreover, many existing axially-fed permeators may be readily modified to provide permeators in accordance with this invention which exhibit enhanced efficiencies of separation.

The axially-fed permeator of this invention for separating by selective permeation at least one fluid from a fluid feed mixture containing at least one other component comprises an elongated fluid impermeable shell having at least one end adapted to receive a tube sheet; a plurality of selectively permeable hollow fibers, said hollow fibers having an exterior surface (shell side) and a bore and said fibers being generally parallelly positioned within the shell to form an elongated bundle of hollow fibers; at least one tube sheet, said tube sheet being in fluid tight relationship with said shell wherein at least one end of each of said hollow fibers is embedded in a fluid tight relationship in said tube sheet and wherein said bores of said hollow fibers communicate through said tube sheet; at least one fluid ingress port communicating through said shell and at least one longitudinally distant fluid egress port communicating through said shell, said ingress and egress ports being in communication with the exterior of the hollow fibers and adapted to provide axial flow of fluid in said shell; and means to longitudinally compact said bundle along the axis of its elongation. Surprisingly, it has been found that the longitudinal compacting of the bundle of hollow fibers can enhance the efficiencies of fluid separations which may be exhibited using the permeator. While the longitudinal compacting increases the packing factor for a given volume of the permeator (volumetric packing factor), this increase can be accomplished without increasing the number of hollow fibers in the permeator thus facilitating the assembly of the permeator without undue risk of damage to the hollow fibers. This increase in volumetric packing factor has been found to tend to reduce the presence, or susceptibility for the formation, of channels in the permeator without unduly increasing the resistance to the radial dispersion of fluid among the hollow fibers in the bundle. In some instances, the resistance to transverse dispersion of fluid in the bundle may be decreased.

In accordance with this invention, the longitudinal compacting of the hollow fiber bundle may be effected by any suitable means. Preferably, the means for longitudinal compacting is not deleterious to the hollow fibers and does not adversely affect fluid flow distribution in the permeator. The means for longitudinally compacting the hollow fiber bundle should provide sufficient longitudinal compacting such that the efficiency of separation of the permeator is enhanced. Often, the amount of compacting necessary to enhance the efficiency of separation may be relatively small. The longitudinal compacting is preferably sufficient to enhance the stability of the hollow fibers from movement due to the force of gravity and/or the forces provided by fluid flow during separation operations. One method for describing the amount of longitudinal compacting is the percent difference between the uncompacted length of the bundle and the compacted length of the bundle based on the uncompacted length of the bundle. The length of the bundle is the mean longitudinal length of the zone of the bundle containing hollow fibers with surface area available to effect separation. The uncompacted length of the bundle is that length when the bundle is in a relaxed state and vertically suspended under the influence of gravity. Frequently the percent of longitudinal compacting is at least about 0.5 percent, say, about 0.7 to 10 percent. In any event, the amount of longitudinal compacting is most desirably sufficient to increase the contact of hollow fibers at the exterior of the bundle with the interior of the shell. Thus the existence of longitudinal channels between the periphery of the bundle and the shell, which channels decrease the efficiency of separation, may be avoided or significantly reduced. With hollow fiber bundles which substantially fill the interior cross-sectional dimensions of the shell when in a relaxed state, the amount of longitudinal compacting required to provide desirable efficiencies of separation may be significantly less than those with bundles which have smaller cross-section dimensions than the internal cross-sectional dimensions of the shell and do not fill the shell when in a relaxed state. Also, in some cases, longitudinal channels may exist after the longitudinal compacting, but preferably substantially all of these channels are shorter than the longitudinal dimension of the bundle. These channels are formed by the relative positioning of the hollow fibers and are terminated by hollow fibers contacting one and another to close the channel. This region in which the channel is closed, due to the resistance to fluid flow which it provides, promotes transverse flow out of the longitudinal channel and around the surrounding hollow fibers.

The means for longitudinally compacting the hollow fiber bundle preferably does not significantly twist the bundle. The individual fibers usually become bowed, i.e., have waves of generally large periods (e.g., often about 10 centimeters or more), due to the longitudinal compacting. The waves may extend outwardly from the longitudinal axis of the hollow fiber in any direction in order to stabilize the hollow fiber bundle and reduce the presence of longitudinal channels. The means employed for the longitudinal compacting are often selected based on the particular design of the permeator. For example, if the permeator is a double open-ended permeator, that is, each end of the shell has a tube sheet, the means for longitudinal compacting may simply comprise a short length of shell which mandates the bundle being compacted for assembly. Single open-ended permeators, that is, only one end of the shell has a tube sheet with either the hollow fibers in the bundle being in a "U" shape with both ends of the hollow fibers being embedded in the tube sheet or one end of the hollow fibers being embedded in the tube sheet and the other end of the hollow fibers being plugged in a fluid impervious manner, e.g., by being embedded, or encased, in a solid material, are more readily adapted to other means for effecting the longitudinal compaction. Typical means for longitudinal compacting single open-ended permeators include the use of a short length of shell; a spacer such as a substantially non-resilient spacer, e.g., plug, between the end of the bundle and the closed end of the shell, or a resilient spacer, e.g., a spring, between the end of the bundle and the closed end of the shell; and when the permeator is oriented in a generally vertical position with the tube sheet down, the force of gravity on the hollow fibers, or on the hollow fibers and an additional weight at the end of the bundle, serves to longitudinally compact the bundle. In assembling a permeator of this invention, it is often preferred to vibrate the shell and bundle, particularly while the permeator is essentially vertical with the tube sheet down regardless of the longitudinal compacting means to be employed, to assist in distributing the hollow fibers in a more stable configuration. In many instances, it is desired that a longitudinal compacting force be maintained on the bundle by the means to longitudinally compact the bundle. Thus, the hollow fibers in the bundle are maintained in a relatively stable configuration from the effects of fluid flow in the permeator and gravity over substantial periods of permeator operation. Especially when a substantially non-resilient spacer is employed, the means for longitudinally compacting the bundle should be capable of being moved, i.e., adjusted, longitudinally such that a desired amount of longitudinal compacting, and hence efficiency of separation, can be easily obtained. Of course, with means such as springs and the force of gravity (when the permeator is generally vertically oriented), the means may be self-adjusting to obtain the desired amount of longitudinal compacting.

Figure 1:
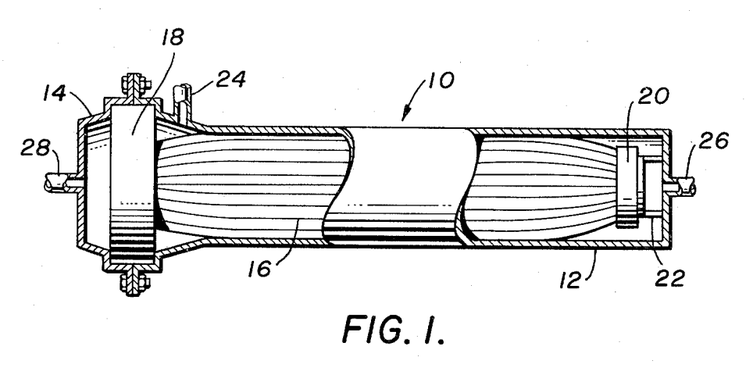
FIG. 1 is a schematic, longitudinal cross-sectional representation of a horizontally-mounted, axially-fed, hollow fiber permeator employing a non-resilient plug as a means for longitudinally compacting the hollow fiber bundle in accordance with this invention.
Figure 2:
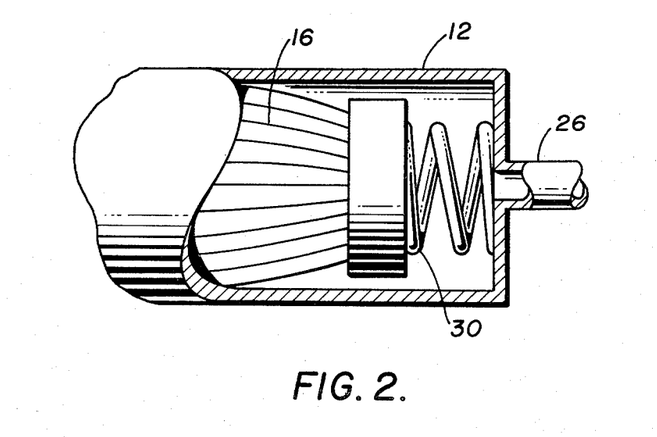
FIG. 2 is a schematic, longitudinal cross-sectional representation of the end portion of a horizontally-mounted, axially-fed, hollow fiber permator employing a spring as a means for longitudinally compacting the hollow fiber bundle in accordance with this invention.
Figure 3:
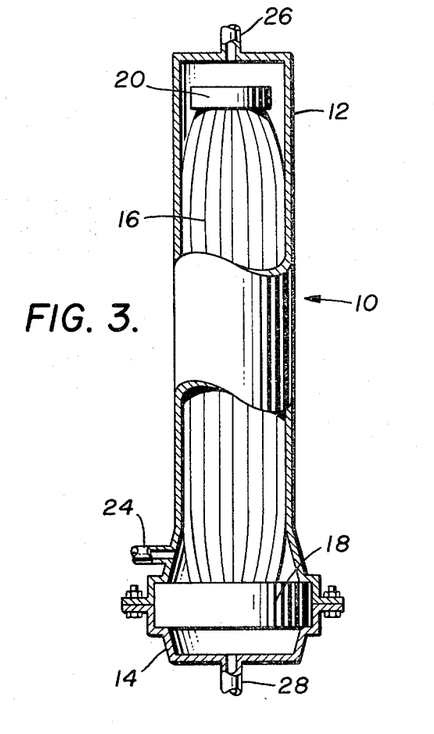
FIG. 3 is a schematic, longitudinal cross-sectional representation of a vertically-mounted, axially-fed, hollow fiber permeator utilizing a weight at the end of the hollow fiber bundle as a means for longitudinally compacting the bundle in accordance with this invention.

In drawings 1, 2 and 3 like reference numerals refer to similar features.

With reference to FIG. 1, the permeator is generally designated by numeral 10 and comprises shell 12. Shell 12 may be comprised of any suitable, fluid impervious material. For sake of convenience metals such as steel are employed due to their ease of fabrication, durability, and strength. The shell may be in any suitable cross-sectional configuration; however, circular cross-sections are preferred. As depicted, shell 12 has a closed end and an open end with open end cap 14 mounted by flanges on shell 12 at the open end.

Bundle 16 composed of a plurality of hollow fibers is positioned within shell 12. Often the bundle comprises over 10,000 hollow fibers, and with smaller diameter hollow fibers and larger diameter shells, there may be in excess of 100,000 or even 1,000,000 fibers. Advantageously, the bundle has essentially the same cross-sectional configuration as that of the shell. One end of each of the hollow fibers in bundle 16 is embedded in tube sheet 18. The bores of the hollow fibers communicate through tube sheet 18 to the open end of shell 12. Tube sheet 18 is mounted in a fluid tight relationship with shell 12 by being positioned between shell 12 and open end cap 14. "O"-rings and similar devices may be employed to ensure achieving the desired fluid tight relationship. The tube sheet may be formed in any suitable manner, e.g., casting a potting material around the end of the bundle such as disclosed in U.S. Pat. Nos. 3,339,341 (Maxwell, et al) and 3,442,389 (McLain) or by impregnating the ends of the fibers with potting material while assembling the hollow fibers to form the bundle such as disclosed in U.S. Pat. Nos. 3,455,460 (Mahon) and 3,690,465 (McGinnis, et al), all of which patents are incorporated by reference. Suitable potting mateials include settable liquid polymeric compositions (such as epoxies, urethanes, etc.), solders, cements, waxes and the like. The other end of each of the hollow fibers is embedded in plug seal 20. Plug seal 20 is similar to tube sheet 18 except that the bores of the hollow fibers do not communicate through the plug seal. Plug seal 20 is illustrated as being freely moveable in a longitudinal direction within shell 12. Positioned within shell 12 between plug seal 20 and the closed end of shell 12 is non-resilient plug 22. Non-resilient plug 22 has sufficient height to effect the desired compacting of bundle 16.

In operation, a fluid feed mixture is introduced into permeator 10 via one of ports 24 and 26 communicating through the shell. While only a single port 24 is depicted, it should be understood that a plurality of ports 24 may be positioned around the periphery of shell 12. The fluid mixture depleted of at least some of the at least one fluid which permeates the membrane is withdrawn via the other of the ports. Most often, the fluid feed mixture is introduced into port 24 which is adjacent to tube sheet 18. The flow of the fluid mixture in permeator 10 is predominantly axial with the fluid mixture dispersing radially into bundle 16. The at least one permeating fluid passes through the walls and into the bores of the hollow fibers utilizing a suitable driving force to effect the permeation. The permeate containing the at least one permeating fluid then passes through tube sheet 18 via the bores of the hollow fibers and exits permeator 10 via port 28 in open end cap 14.

With reference to FIG. 2, spring 30 which is under compression is utilized to provide the desired longitudinal compacting of bundle 16. Unlike the embodiment of the invention set forth in FIG. 1 in which a non-resilient plug is employed to effect the longitudinal compacting and the height of the non-resilient plug determines the amount of longitudinal compacting, the amount of longitudinal compacting is primarily dependent upon the force exerted by the spring. Thus, more powerful springs can generally provide greater amounts of longitudinal compacting in a given permeator system. The orientation of the permeator may have an influence on the selection of the spring force desired. For instance, if the longitudinal axis of the hollow fiber bundle is essentially horizontal, little, if any, of the weight of the hollow fiber bundle will be supported by the spring. On the other hand, if the longitudinal axis of the hollow fiber bundle is vertical, with the seal being up, a substantial portion of the weight of the hollow fibers and plug will be borne by the spring. Conveniently, a suitable spring can be selected by placing the permeator in its expected orientation during use and determining the force required to provide the desired longitudinal compacting of the hollow fiber bundle. Although spring 30 is depicted as being a spiral spring, it is clear that other springs such as curved ribbon springs and the like may alternatively be employed. The spring may be oriented such that it is compressed or expanded to provide the resilient forces which effect the longitudinal compacting of the hollow fiber bundle.

FIG. 3 illustrates a particularly convenient permeator in accordance with this invention wherein the longitudinal compacting is provided by the force gravity. As depicted, plug seal 20 is of sufficient weight to enable the desired longutidinal compaction of hollow fiber bundle 16 to be obtained. In general, the more resilient the hollow fibers are to the longitudinal compacting force, and the greater the forces exerted by the fluid passing through the permeator, the greater the weight of plug seal 20 must be in order to obtain a desired amount of longitudinal compacting. One convenient method for determining a suitable weight for plug seal 20 for a given permeator comprises fabricating a permeator with a plug seal of a known weight. Then, when the permeator is in the intended orientation for operation (and preferably the permeator is in operation especially when the fluid is liquid), the force required to provide the desired amount of longitudinal compacting is determined and weight can be added or removed from the plug seal, or the weight of subsequent plug seals appropriately adjusted, to provide the desired percentage of longitudinal compacting.

The weight for longitudinally compacting the hollow fiber bundle may comprise means other than plug seal 20. For instance, disc or ring-shaped weights may be provided in the space between plug 20 and the closed end of shell 12 such that when the hollow fiber bundle is in a generally vertical orientation, the weights rest upon plug seal 20 to provide the desired force for longitudinally compacting the hollow fiber bundle. Alternatively, the hollow fiber bundle may be "U"-shaped with the curved segment of the "U" being proximate to the closed end of shell 12 and a disc-shaped weight being positioned on this curved segment. Often the weight for longitudinally compacting the hollow fiber bundle is about 1 to 50 or more grams per square centimeter of cross-sectional area of the bundle.

Figure 4:
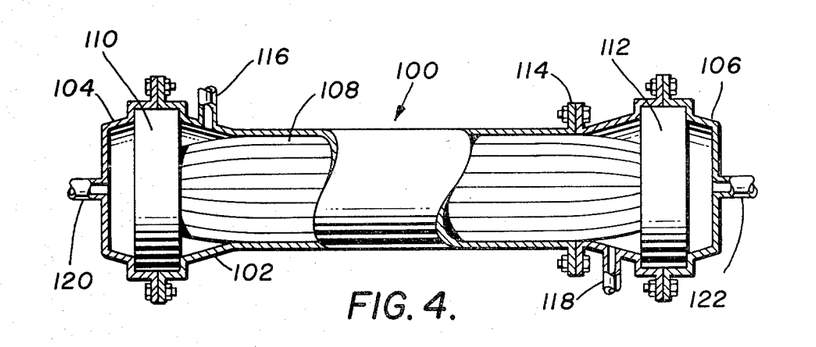
FIG. 4 is a schematic, longitudinal cross-sectional representation of double open-ended, horizontally-mounted, axially-fed hollow fiber permeator having a short shell to provide longitudinal compacting of the fiber bundle in accordance with this invention.

Double open-ended permeator 100 is depicted in FIG. 4. Double open-ended permeator 100 comprises shell 102 which is open at both ends. End caps 104 and 106 are mounted by flanges on shell 102 at the open ends. Bundle 108 containing a plurality of hollow fibers is positioned within shell 102 and is terminated at the ends by tube sheet 110 and tube sheet 112. The bores of the hollow fibers communicate through the tube sheets. The tube sheets are held in a fluid-tight relationship with shell 102 by being positioned between the respective end cap and the end of shell 102. In the fabrication of the double-ended permeator which is illustrated, one or both of tube sheets 110 and 112 are formed after the hollow fibers have been inserted into shell 102. Shell 102 is provided with flange 114 which, during fabrication of the last seal, is open with spacers positioned between each face of the flange to increase the length of the shell. The spacers correspond to the desired amount of longitudinal compacting such that when the spacers are removed and the flange is reassembled, the bundle is longitudinally compacted. Alternatively, the bundle with the tube sheets may be fabricated prior to insertion into shell 102.

In representative operations, a fluid, which fluid may be the fluid feed mixture or a sweep fluid enters the interior of shell 102 (i.e., shell side of the permeator) via port 116 and fluid exits via longitudinally distant port 118. A plurality of ports 116 and 118 distributed around the periphery of shell 102 may be employed. If a sweep fluid is passed through port 116, then the fluid feed mixture is passed through port 120 in end cap 104 or port 122 in end cap 106, depending upon whether cocurrent or countercurrent flows are desired in the permeator, with the port in the opposite end cap serving to provide for the egress of fluid. Thus, the fluid feed mixture is passed through the bores of the hollow fibers. Permeating fluid passes through the walls of the hollow fibers and exits with the sweep fluid. If the fluid feed mixture is passed through port 116, then the permeating fluid passes through the walls of the hollow fibers to the bores and the fluid feed mixture depleted of at least some of the permeating fluid exits the interior of shell 102 via port 118. The permeating fluid in the bores of the hollow fibers can exit through each of ports 120 and 122, or a sweep fluid can be passed through the bores of the hollow fibers, entering via port 120 or 122 and exiting via the other port, depending upon whether cocurrent or countercurrent flows are desired in the permeator.

It has been found that enhanced fluid dispersions through the hollow fiber bundle of axially fed permeators are obtained with higher space velocities. Accordingly, smaller bundle diameters are often preferred, e.g., about 0.02 or 0.05 to 0.5 meter in diameter. The effective length of the hollow fibers in the bundle may also vary widely, for instance, from about 0.2 to 15 or 20 meters, e.g., about 1 to 10 meters. Generally, with bundles having larger diameters, desirable dispersions can be obtained with the use of longer bundle lengths. The packing factor of the hollow fibers in the permeator based on the inside cross-sectional dimensions of the permeator shell over the length of hollow fiber having surface area available to effect separations and the cross-sectional area of the hollow fibers (hereafter sometimes referred to as the reference packing factor) is preferably at least about 35, say, about 40 or 45 to 65, often about 45 to 55 or 60, percent.

The hollow fibers may be fabricated from any suitable synthetic or natural material suitable for fluid separations or as supports for materials which effect the fluid separations. The selection of the material for the hollow fiber may be based on the heat resistance, chemical resistance, and/or mechanical strength of the hollow fiber as well as other factors dictated by the intended fluid separation in which it will be used and the operating conditions to which it will be subjected.

Hollow fiber diameters may be selected over a wide range; however, the hollow fiber should have sufficient wall thickness to provide adequate strength to the hollow fiber. Frequently, the outside diameter of the hollow fibers is at least about 50, say, at least about 100, microns, and the same or different outside diameter fibers may be contained in a bundle. Often, the outside diameters are up to about 800 or 1000 microns. Although larger outside diameter hollow fibers can be employed, they are less preferred due to the low ratios of hollow fiber surface area per unit volume of fluid separation apparatus which are provided. Preferably, the outside diameter of the hollow fibers is about 150 or 350 to 800 microns. Often larger diameter hollow fibers (e.g., at least about 350 microns in diameter) are desired due to the frequently resulting enhanced transverse dispersion of fluid among the hollow fibers with axial fluid flow in the bundle. Generally, the wall thickness of the hollow fibers is at least about 5 microns, and in some hollow fibers, the wall thickness may be up to about 200 or 300 microns, say, about 50 to 200 microns. With hollow fibers fabricated from materials having lesser strengths, it may be necessary to employ larger fiber diameters and wall thicknesses to impart sufficient strength to the hollow fiber.

In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions of the walls of the hollow fibers. The density of the hollow fiber can be essentially the same throughout its wall thickness, i.e., isotropic, or the hollow fiber can be characterized by having at least one relatively dense region within its wall thickness in barrier relationship to fluid flow through the wall of the hollow fiber, i.e., the hollow fiber is anisotropic. Generally, a relatively dense region of anisotropic hollow fibers is substantially at the exterior of the hollow fiber.

Particularly advantageous hollow fibers for use in axially-fed permeators in accordance with this invention are hollow fibers having low amplitude waves, or crimps, such as disclosed by Leonard in U.S. patent application Ser. No. 855,850, filed Nov. 30, 1977, now abandoned, herein incorporated by reference. The amplitude of the crimps as referred to herein as one-half the lateral distance between the midpoint of the hollow fiber at one apex to the midpoint of the hollow fiber at the next adjacent, diametrically-opposed apex. When no adjacent, diametrically-opposed apex exists, the amplitude is the lateral distance between the midpoint of the hollow fiber at the apex to the midpoint of the hollow fiber which is not crimped. Advantageously, the amplitude of the crimps is less than about 50 percent of the diameter of the hollow fiber, and generally, the amplitudes of the crimps are within the range of about 1 to 30 percent of the diameter of the hollow fiber. Fiber crimp amplitudes of above about 50 percent of the diameter can also be employed; however, generally after the bundle of fibers is assembled, the bundle must be compressed to obtain a desirably high packing factor. Some compression of the bundle serves to maintain the hollow fibers in a substantially fixed relationship to each other. Each of the crimps in a hollow fiber or among the hollow fibers employed to form the bundle may have the same or different amplitude than other crimps, and the amplitudes of the crimps may vary over a range to assist in breaking any register between hollow fibers. Moreover, the bundle may contain hollow fibers having substantially no crimps, which fibers are interspersed with hollow fibers having crimps. The crimps need not be continuous over the length of a hollow fiber. Thus, the crimps may be intermittently spaced over the length of the hollow fiber, and the frequency of the crimps may be irregular. Moreover, as stated above, fibers with a distribution of crimp frequency can be employed. Generally, at least about 50 percent, preferably at least about 75 percent, of the fibers in a bundle are crimped. The hollow fibers which are crimped frequently have an average of at least one crimp per each five centimeters of fiber length. The average frequency of crimps over the length of a hollow fiber is often about 0.2 to 10 or more, say, about 0.25 to 5, per centimeter. If the frequency of the crimps in the hollow fiber is irregular, the crimps generally range in frequency from about 1 to about 50 crimps per five centimeters, e.g., from about 1 to about 30 crimps per five centimeters, of hollow fiber length. The period of the crimps, i.e., the length of each crimp, is desirably sufficiently short that the crimp maintains its configuration, and substantial changes in amplitude of the crimp do not occur when the hollow fibers are assembled into a bundle. For instance, if the period of the crimp is too long and gradually ascends to its apex, then even minor mechanical forces may tend to straighten out the hollow fiber. In order to obtain the advantages provided by this invention, the period of the crimp can be relatively short, e.g., less than about 5 centimeters. The shortness of the crimps is generally limited by the dimensions of the hollow fiber, i.e., with smaller diameter hollow fibers generally smaller crimp periods can be obtained. Frequently, the average crimp period is about 0.05 to 5, e.g., about 0.1 to 2, centimeters. The ratio of the average crimp period to the average frequency of crimps may vary widely, for instance, from about 0.05:1 to 1:1, often about 0.1:1 to 1:1. In assembling bundles containing this crimped hollow fiber, it is desired that the crimps in the hollow fibers do not fall in register. Advantageously, at least some of the hollow fibers vary in at least one of crimp frequencies, crimp period, and crimp amplitudes such that with a random assembly of the hollow fibers, the probability of obtaining an undue amount of fibers in register is minimal.

The material for forming the hollow fibers may be inorganic, organic or mixed inorganic and organic. Typical inorganic materials include glasses, ceramics, cermets, metals and the like. The organic materials are usually polymers. In the case of polymers, both addition and condensation polymers which can be fabricated in any suitable manner to provide hollow fibers are included. Generally organic and some times organic polymers mixed with inorganics (e.g., fillers) are used to prepare the hollow fibers. Typical polymers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate; cellulose-acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly (ester-amide-diisocyanate); polyurethanes; polyesters (including polyarylates), such as poly(ethylene terephthalate), poly(alkyl methacrylates), poly(alkyl acrylates), poly (phenylene terephthalate); etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly (vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; polyacetals; etc., and interpolymers, including block terpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The following examples are provided to further illustrate the invention. All parts and percentages of liquids and solids are by weight, and all parts and percentages of gases are by volume, unless otherwise indicated.

EXAMPLE 1

A hollow fiber is prepared from dried polysulfone polymer having the repeating unit where n, representing the degree of polymerization, is about 50 to 80 and is available from Union Carbide under the designation P-3500. The polysulfone is admixed with dimethylacetamide to provide a dope containing about 27.5 weight percent polymer, and the dope is coagulation spun into water at a temperature of about 4° C. through a spinnerette which is immersed in the water. The spinnerette has an outer orifice diameter of 0.0559 centimeters, an inner pin of 0.0229 centimeters, and an injection port of 0.0127 centimeters through which water is introduced. The dope is pumped and metered to the spinnerette at a rate of about 7.2 milliliters per minute and is drawn from the spinnerette as a hollow fiber at a rate of about 33 meters per minute. After the coagulation has substantially occurred, the hollow fiber is washed with water at room temperature. The hollow fiber is wound substantially without tension on a 12 inch (approximately 25.4 centimeters between inside heads) bobbin with a bobin winder, i.e., the hollow fiber is fed through an axially traversing guide (which reverses at each end of the bobbin) and is collected on the surface of a rotating bobbin so that the hollow fiber is wound on the bobbin in sequential layers of helical coils. The bobbin is stored in an aqueous vat at room temperature during which time the fibers on the bundle shrink to impart crimps. The hollow fibers are then wound on a skeiner having about a six meter circumference. The hollow fibers are removed as three meter long hanks and are hung and allowed to dry at ambient laboratory temperature and humidity. The hollow fibers have an outside diameter of about 540 microns and an inside diameter of about 260 microns and have irregular crimps of low amplitude due to the shrinkage of the hollow fiber while wound on the bobbins.

EXAMPLE 2

Hollow fibers prepared by the procedure substantially set forth in Example 1 are assembled into a hollow fiber bundle in the following manner. A hank of dried hollow fibers containing about 20,000 strands and being about 10 centimeters in diameter (when tightly bound with tape) and slightly over 3 meters in length is severed at both ends to provide a hank slightly less than 3 meters in length. Plastic tape is wound around each end of the hank to hold the end in a tight circular configuration. An epoxy tube sheet is fabricated at one end of the hank by sealing the opening to the hollow fibers and then immersing the open end of the hank into a liquid epoxy resin and allowing the epoxy to cure. After curing, the epoxy is severed transversely to the orientation of the hollow fibers to open the bores of the hollow fibers. An electric plane is utilized to ensure that the hollow fibers have a high degree of openness for fluid communication into the bores of the hollow fibers as disclosed by Danos, et al, in U.S. patent application Ser. No. 855,845, filed Nov. 30, 1977, now U.S. Pat. No. 4,183,283. The resultant epoxy tube sheet has a diameter of about 15 centimeters and a length of about 10 centimeters. The remaining end of the hank is immersed in liquid epoxy and the epoxy cures in order to form a plug seal. The plug seal has a diameter of about 9.5 centimeters and a length of about 2.5 centimeters. This procedure is substantially repeated six times to prepare hollow fiber bundles A, B, C, D, E and F. Each of the bundles is assembled in an axially-fed permeator shell such as schematically represented in FIG. 1. The permeator has an internal diameter of about 10.16 centimeters. A solution of 5 weight percent Sylgard 184 in isopentane is fed through the shell-side of each permeator. Sylgard 184 is a cross-linkable dimethylsiloxane polymer which is available from Dow Corning and cures at ambient temperatures. The bores of the hollow fibers are in communication with a vacuum of about 600 to 700 millimeters of mercury. The circulation of the Sylgard solution continues for about 30 minutes, and the vacuum is continued for about another 15 minutes after the Sylgard 184 solution is withdrawn from the shell-side of the permeator. The coated bundle is cured at about 40° to 50° C. for about 24 hours by passing nitrogen through the shell-side of the permeator.

The reference packing factor for each permeator is determined by multiplying the cross-sectional area of a representative hollow fiber in the bundle times the estimated number of fiber strands in the bundle and then dividing the product by the internal cross-sectional area of the permeator shell wherein the quotient is multiplied by 100 to provide percent packing factor. The reference packing factor for each bundle is as follows:

| Bundle | Packing Factor, % |
|---|---|
| A | 49.6 |
| B | 55.9 |

-continued

| Bundle | Packing Factor, % |
|---|---|
| C | 48.0 |
| D | 50.0 |
| E | 51.3 |
| F | 50.1 |

Each of the permeators is tested to determine hydrogen efficiencies and separation efficiencies when the bundle is longitudinally compacted in accordance with this invention. Comparative tests are conducted with bundles A, B and C to further demonstrate the significance of this invention. The permeators in accordance with this invention employ as means for longitudinally compacting the bundle either a non-resilient plug which is positioned between the plug seal and the end of the shell (permeator oriented horizontally) or the force of gravity with the permeator oriented vertically with the tube sheet down. In the fabrication of permeators using either means for longitudinally compacting, the permeator containing the bundle is oriented vertically with the tube sheet down and is vibrated by striking the permeator with a heavy wooden stick to settle the hollow fibers in the bundle to a more stable position. In the permeators containing the non-resilient plug, the end of the shell adjacent the plug seal is removed and a non-resilient plug is prepared having a height approximately the same as the distance between the plug seal of the settled bundle and the end of the shell and installed. It is estimated that the amount of longitudinal compacting of the bundle in the permeators in accordance with this invention is about 2.5 to 5 or 7 centimeters. For each bundle and each permeator design whether in accordance with this invention or comparative, at least one test run is conducted with each run consisting of three experimental tests. The first test comprises feeding to the shell-side of the permeator a blend gas containing about 74 volume percent hydrogen and 26 volume percent carbon monoxide at a particular shell-side velocity. This procedure is repeated twice except that pure hydrogen and pure carbon monoxide are the feed gases. In each test, the shell-side of the permeator is maintained at about 8 to 10 atmospheres absolute and the bore side of the hollow fibers is at a total pressure of about 2 to 6 atmospheres absolute. The permeabilities of the permeate gases for each test are determined. A separation factor is determined using the results from the blend gas test by dividing the permeability of hydrogen by the permeability of carbon monoxide. A pure gas separation factor is also determined by dividing the permeability of hydrogen using the pure hydrogen feed by the permeability of carbon monoxide using the pure carbon monoxide feed. A hydrogen efficiency is determined by dividing the hydrogen permeability determined using the blend gas by the hydrogen permeability determined using the pure hydrogen feed. A separation efficiency is also determined by dividing the separation factor calculated from the permeabilities of the components of the blend gas by the pure gas separation factor. Lower hydrogen efficiencies and lower separation efficiencies are often indicative of poor fluid dispersion in the hollow fiber bundle such that localized zones of high concentrations of the undesired component (carbon monoxide) occur and thus increase the permeation of the undesired component and lower the separation factor. Generally, as the velocity of the feed to the permeator is increased, the efficiencies are increased.

The permeator containing bundle A is utilized in accordance with two modes of this invention, that is, (1) substantially vertically oriented with the tube sheet down and the epoxy plug seal providing the desired longitudinal compaction of the hollow fiber bundles and (2) substantially horizontally oriented with non-resilient plug with a sufficient height to provide the desired longitudinal compactions, and is utilized in accordance with two modes outside the scope of this invention, that is, (3) substantially horizontally oriented with no spacer to provide longitudinal compaction and (4) substantially vertically oriented with the tube sheet up. The results using bundle A are reported in Table I.

TABLE I

| | BUNDLE A | | | | | | | |
|---|---|---|---|---|---|---|---|---|
| | BLEND GAS | | | PURE GAS | | | | |
| | Permeability, cc(STP)/cm$^2$-sec-cm(Hg) × 10$^6$ | | | | | | Hydrogen | Separation |
| Shell Side Velocity | | | Separation | | | Separation | Efficiency | Efficiency |
| Meters per Second | H$_2$ | CO | Factor | H$_2$ | CO | Factor | % | % |
| Vertical Orientation, Tube Sheet Down: | | | | | | | | |
| 0.18 | 35 | 2.2 | 16 | 50 | 1.9 | 26 | 70 | 62 |
| 0.21 | 40 | 2.1 | 19 | 47 | 1.8 | 26 | 85 | 73 |
| 0.28 | 47 | 2.3 | 21 | 47 | 1.8 | 26 | 100 | 81 |
| Horizontal Orientation, Non-Resilient Plug: | | | | | | | | |
| 0.24 | 51 | 2.4 | 21 | 61 | 2.8 | 22 | 84 | 95 |
| 0.24 | 54 | 2.4 | 23 | 61 | 2.8 | 22 | 89 | 105 |
| 0.24 | 58 | 2.5 | 23 | 60 | 2.7 | 22 | 96 | 105 |
| 0.30 | 48 | 2.6 | 18 | 61 | 2.8 | 22 | 78 | 82 |
| 0.36 | 55 | 2.7 | 20 | 61 | 2.8 | 22 | 90 | 91 |
| Comparative, Horizontal Orientation: | | | | | | | | |
| 0.06 | 8.8 | 7.3 | 1.2 | 54 | 2.4 | 23 | 16 | 5 |
| 0.18 | 11 | 4.7 | 2.3 | 54 | 2.4 | 23 | 20 | 10 |
| 0.19 | 11 | 4.1 | 2.8 | 46 | 1.7 | 27 | 25 | 10 |
| 0.20 | 11 | 4.6 | 2.4 | 47 | 1.8 | 27 | 24 | 9 |
| 0.25 | 13 | 3.9 | 3.4 | 47 | 1.8 | 27 | 27 | 13 |
| Comparative, Vertical Orientation, Tube Sheet Up: | | | | | | | | |
| 0.18 | 43 | 2.6 | 17 | 50 | 2.2 | 23 | 86 | 74 |
| 0.19 | 32 | 2.8 | 11 | 52 | 2.2 | 24 | 61 | 46 |
| 0.30 | 43 | 2.6 | 17 | 52 | 2.2 | 24 | 83 | 71 |

The permeator containing bundle B is utilized in accordance with two modes of the invention and two modes outside the scope of the invention as is bundle A. The results using bundle B are reported in Table II. The comparative runs using horizontal orientation of the permeator designated by an asterisk are conducted promptly such that the hollow fibers do not have sufficient time to settle and form flow channels in the bundle. The other comparative runs using the horizontal orientation of the permeator are conducted after about 2 or 3 days of settling. As can be observed, the settling of hollow fibers in horizontally oriented permeators can have substantial effects on the performance of the permeator.

TABLE II

| | BUNDLE B | | | | | | | |
|---|---|---|---|---|---|---|---|---|
| | BLEND GAS | | | PURE GAS | | | | |
| | Permeability, cc(STP)/cm$^2$-sec-cm(Hg) × 10$^6$ | | | | | | Hydrogen | Separation |
| Shell Side Velocity | | | Separation | | | Separation | Efficiency | Efficiency |
| Meters per Second | H$_2$ | CO | Factor | H$_2$ | CO | Factor | % | % |
| Vertical Orientation, Tube Sheet Down: | | | | | | | | |
| 0.20 | 43 | 2.1 | 20 | 43 | 1.9 | 23 | 100 | 87 |
| 0.28 | 39 | 2.1 | 18 | 42 | 1.8 | 23 | 93 | 78 |
| Horizontal Orientation, Non-Resilient Plug: | | | | | | | | |
| 0.20 | 22 | 1.8 | 12 | 41 | 1.5 | 27 | 55 | 44 |
| 0.21 | 20 | 1.9 | 11 | 41 | 1.5 | 27 | 49 | 41 |
| 0.37 | 26 | 1.6 | 16 | 41 | 1.5 | 27 | 63 | 59 |
| Comparative, Horizontal Orientation: | | | | | | | | |
| 0.18 | 17 | 3.3 | 5.1 | 50 | 2.1 | 24 | 33 | 21 |
| 0.19 | 17 | 3.8 | 4.5 | 49 | 2.0 | 25 | 35 | 18 |
| 0.21* | 26 | 2.8 | 9.2 | 53 | 2.3 | 23 | 48 | 40 |
| 0.32* | 40 | 2.7 | 15 | 53 | 2.3 | 23 | 75 | 65 |
| 0.33 | 35 | 2.5 | 14 | 46 | 1.8 | 25 | 76 | 56 |
| Comparative, Vertical Orientation, Tube Sheet Up: | | | | | | | | |
| 0.16 | 36 | 3.1 | 11 | 60 | 2.8 | 21 | 60 | 52 |
| 0.24 | 36 | 3.0 | 12 | 60 | 2.8 | 21 | 60 | 57 |
| 0.31 | 40 | 3.0 | 14 | 60 | 2.8 | 21 | 67 | 67 |

The permeator containing bundle C is utilized in accordance with a mode of this invention by being substantially vertically oriented with the tube sheet down and the weight of the epoxy plug seal providing the desired longitudinal compacting. Comparative tests are also conducted with the permeator being substantially horizontally oriented without a non-resilient plug to provide longitudinal compacting. The results are reported in Table III. The comparative runs designated by an asterisk are conducted promptly such that the hollow fibers do not have sufficient time to settle and thus form flow channels in the bundle. As can be observed from the other comparative runs which are conducted after the hollow fibers had an opportunity to settle, settling of the hollow fibers can have substantial effects on the performance of the permeator.

TABLE III

| | BUNDLE C | | | | | | |
|---|---|---|---|---|---|---|---|
| | BLEND GAS | | | PURE GAS | | | |
| | Permeability, cc(STP)/cm$^2$-sec-cm(Hg) × 10$^6$ | | | | | Hydrogen | Separation |
| Shell Side Velocity | | | Separation | | | Separation | Efficiency | Efficiency |
| Meters per Second | H$_2$ | CO | Factor | H$_2$ | CO | Factor | % | % |
| Vertical Orientation, Tube Sheet Down: | | | | | | | | |
| 0.20 | 57 | 2.0 | 28 | 58 | 2.3 | 25 | 99 | 112 |
| 0.24 | 61 | 2.1 | 29 | 58 | 2.3 | 26 | 104 | 112 |
| 0.29 | 42 | 2.1 | 21 | 58 | 2.3 | 26 | 72 | 81 |
| Comparative, Horizontal Orientation: | | | | | | | | |
| 0.14* | 55 | 2.5 | 22 | 64 | 2.7 | 24 | 86 | 92 |
| 0.15 | 39 | 2.7 | 14 | 59 | 2.4 | 25 | 65 | 36 |
| 0.25 | 33 | 2.3 | 15 | 59 | 2.4 | 25 | 57 | 60 |
| 0.28* | 61 | 2.7 | 23 | 64 | 2.7 | 24 | 96 | 96 |

The remaining permeators, i.e., the permeators containing bundles D, E and F are utilized in a substantially vertical orientation with the tube sheet down and the epoxy plug seal providing the desired longitudinal compacting of the bundle. The results are provided in Table IV.

TABLE IV

| | BLEND GAS | | | PURE GAS | | | | |
|---|---|---|---|---|---|---|---|---|
| | Permeability, cc(STP)/cm$^2$-sec-cm(Hg) × 10$^6$ | | | | | Hydrogen | Separation |
| Shell Side Velocity | | | Separation | | | Separation | Efficiency | Efficiency |
| Meters per Second | H$_2$ | CO | Factor | H$_2$ | CO | Factor | % | % |
| Bundle D: | | | | | | | | |
| 0.20 | 42 | 2.7 | 16 | 51 | 2.2 | 23 | 83 | 70 |
| 0.26 | 44 | 2.4 | 18 | 51 | 2.2 | 23 | 86 | 78 |
| Bundle E: | | | | | | | | |
| 0.19 | 70 | 2.9 | 24 | 67 | 2.7 | 25 | 104 | 96 |
| Bundle F: | | | | | | | | |
| 0.23 | 84 | 3.1 | 27 | 78 | 2.6 | 30 | 108 | 90 |

It is claimed:

1. A permeator for separating by the selective permeation of at least one fluid from a fluid mixture containing at least one other component comprising an elongated, fluid impermeable shell having at least one end adapted to receive a tube sheet; a plurality of selectively permeable hollow fibers, said hollow fibers having an exterior surface and a bore and said hollow fibers being generally parallelly positioned within the shell to form an elongated bundle of hollow fibers; at least one tube sheet, said tube sheet being in fluid tight relationship with said shell wherein at least one end of each of said hollow fibers is embedded in a fluid tight relationship in said at least one tube sheet and wherein said bores of said hollow fibers communicate through said tube sheet; at least one fluid ingress port communicating through said shell and at least one longitudinally distant fluid egress port communicating through said shell, said ingress and egress ports being in communication with the exterior surface of the hollow fibers and adapted to provide axial flow of fluid in said shell; and means for longitudinally compacting said bundle of hollow fibers whereby said bundle is sufficiently longitudinally compacted to enhance the efficiency of separation.

2. The permeator of claim 1 in which the packing factor based on the inside cross-sectional dimensions of the shell and the cross-sectional area of the hollow fibers is at least about 35 percent.

3. The permeator of claim 2 in which the hollow fibers have an outside diameter of about 100 to 1000 microns.

4. The permeator of claim 2, in which the hollow fibers have an outside diameter between about 350 to 800 microns.

5. The permeator of claim 2 in which the packing factor based on the inside cross-sectional dimensions of the shell and the cross-sectional area of the hollow fibers is about 45 to 60 percent.

6. The permeator of claim 2 in which the means for longitudinally compacting the bundle is adapted to longitudinally compact the bundle at least about 0.5 percent.

7. The permeator of claim 6 in which the permeator has a tube sheet at each end.

8. The permeator of claim 11 or 7 in which the means for longitudinally compacting the bundle comprises the use of a short length of shell which requires longitudinal compacting the bundle.

9. The permeator of claim 1, or 7 in which the means for longitudinally compacting the bundle is adapted to longitudinally compact the bundle about 0.7 to 10 percent.

10. The permeator of claim 1, or 7 in which at least about 50 percent of the hollow fibers have a plurality of crimps, said crimps having crimp amplitudes up to about 50 percent of the outside diameter of the hollow fiber, an average crimp period of less than about 5 centimeters and a ratio of average crimp period to average crimp frequency of about 0.1:1 to 1:1.

11. The permeator of claim 6 in which the permeator has one tube sheet.

12. The permeator of claim 11 in which the means for longitudinally compacting said bundle comprises a spacer positioned between the end of the bundle and the closed end of the shell.

13. The permeator of claim 12 in which the spacer is a substantially non-resilient spacer.

14. The permeator of claim 12 in which the spacer is a resilient spacer.

15. A permeator for separating by the selective permeation of at least one fluid from a fluid mixture containing at least one other component comprising an elongated, fluid impermeable shell having at least one end adapted to receive a tube sheet wherein said elongated shell is in a generally vertical position; a plurality of selectively permeable hollow fibers, said hollow fibers having an exterior surface and a bore and said hollow fibers being generally parallelly positioned within the shell to form an elongated bundle of hollow fibers; a tube sheet, said tube sheet being in fluid tight relationship with said shell wherein at least one end of each of said hollow fibers is embedded in a fluid tight relationship in said tube sheet, wherein said bores of said hollow fibers communicate through said tube sheet, and wherein said bundle extends above said tube sheet; a weight on the end of said bundle opposite said tube sheet whereby said bundle is sufficiently longitudinally compacted by the force of gravity to enhance the efficiency of separation; at least one fluid ingress port communicating through said shell and at least one longitudinally distant fluid egress port communicating through said shell, said ingress and egress ports being in communication with the exterior surface of the hollow fibers and adapted to provide axial flow of fluid in said shell.

16. The permeator of claim 15 in which the end of the bundle opposite from the tube sheet is encased in a plug seal.

17. The permeator of claim 15 in which the packing factor based on the inside cross-sectional dimensions of the shell and the cross-sectional area of the hollow fibers is at least about 35 percent.

18. The permeator of claim 17 in which the packing factor based on the inside cross-sectional dimensions of the shell and the cross-sectional area of the hollow fibers is about 45 to 60 percent.

19. The permeator of claim 17 in which the bundle is longitudinally compacted at least about 0.5 percent.

20. The permeator of claim 19 in which the hollow fibers have an outside diameter between about 350 to 800 microns.

21. The permeator of claim 15 in which the bundle is longitudinally compacted about 0.7 to 10 percent.

22. The permeator of claim 15 in which at least about 50 percent of the hollow fibers have a plurality of crimps, said crimps having crimp amplitudes up to about 50 percent of the outside diameter of the hollow fiber, an average crimp period of less than about 5 centimeters and a ratio of average crimp period to average crimp frequency of about 0.1:1 to 1:1.

* * * * *